Inventors
Anthony Raneri
Americo Frank Garbarino
By Chas. R. Fay
Attorney

United States Patent Office 3,533,107
Patented Oct. 13, 1970

3,533,107
SAFETY GARMENT FOR CYCLIST
Anthony Raneri, 87 Lindon St., Allston, Mass. 02045, and Americo Frank Garbarino, 74 Bolton Road, South Lancaster, Mass. 01561
Filed Dec. 4, 1967, Ser. No. 687,688
Int. Cl. A41d 1/00
U.S. Cl. 2—93                                2 Claims

ABSTRACT OF THE DISCLOSURE

A safety garment for the driver of a cycle including handles preferably arranged at the side of the body of the driver in position to be grasped comfortably by the passenger on the pillion, i.e., on the tandem seat, for the purpose of helping to anchor the passenger more firmly with the least inconvenience.

One form of the safety garment comprises a belt-like member which encircles the body of the driver, the handles being attached to the belt preferably at the sides thereof; the belt can be worn under a jacket having slits at the sides so that the passenger may thrust his hands through the slits to grasp the handles and at the same time have his hands protected against the weather. Alternatively, the handles may be located on the jacket, trousers, etc.

---

This invention relates to a safety garment including handles or gripping means intended to be worn by the driver of a cycle so that the passenger on the tandem seat is enabled to comfortably grasp the handles for a safer seating position. Although the handles or grips may take many different forms and may be placed directly on a jacket or shirt or on trousers, the preferred form of the invention contemplates the use of a relatively wide belt of some strong material such as leather which passes completely about the body of the driver of the cycle, with the handles being located at the side portions thereof so that the passenger, in the rear, can easily grasp these handles for a secure position on the tandem seat.

Another object of the invention resides in the provision of a jacket having slits therein to be worn over the belt so as to allow the passenger to place his hands inside the garment for protection, the slits being in position to correspond with the handles.

Another object of the invention resides in the provision of a crossed belt to be worn on the back of the driver or passenger or both, this crossed belt having a vivid color, or a radiant material for increased visibility.

Other objects and advantages of the invention will appear hereinafter.

Reference is to be had to the accompanying drawings in which.

Figure 1:
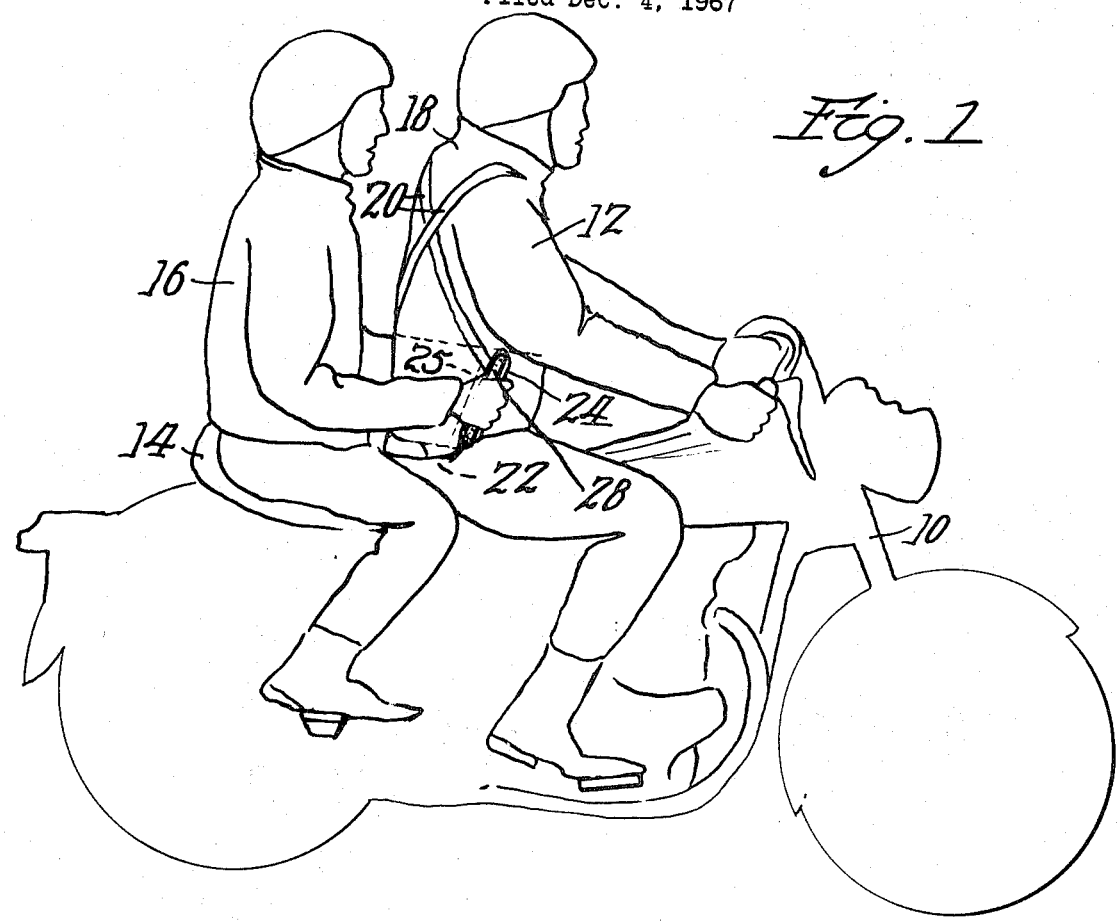
FIG. 1 is a view in elevation of a cycle illustrating the invention in use.

A cycle of any conventional type is shown in FIG. 1 and is generally indicated at 10. The driver is indicated at 12, the tandem seat at 14, and the passenger at 16. In FIG. 1, the driver has on a jacket generally indicated at 18 which is provided with brilliantly colored crossed belts or strips 20 for increased visibility, these belts being of any bright color or utilizing radiant or fluorescent material for increased visibility to others. The passenger may also wear such a garment.

Figure 2:
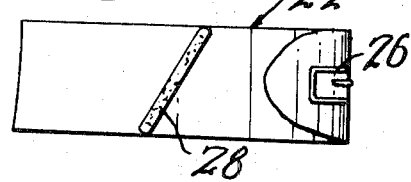
FIG. 2 is a view in elevation showing the handles applied to a belt.

Under the jacket 12 the driver wears the belt shown in FIG. 2 which is located as shown in dotted lines in FIG. 1, and is indicated by the reference numeral 22. The jacket is provided with slits 24 for convenience of the passenger 16 in slipping the hands inside the jacket 12 for protection against the elements, see the dotted line 25, FIG. 1.

Figure 3:
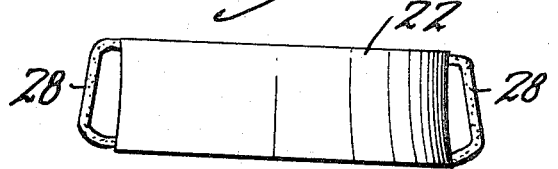
FIG. 3 is a view in elevation looking in the direction of arrow 3 in FIG. 2.

Referring now to FIGS. 2 and 3, the belt 22 may be provided with any kind of fastening or buckle as indicated at 26. It extends completely about the body of the wearer and may be attached to a garment if desired in any well known way. The novel feature of this belt consists in the provision of gripping handles 28, 28 which are mounted in any way desired on the belt at the sides thereof as shown in FIG. 2, the buckle 26 being at the front of the belt. It is preferred that these handles 28 shall be mounted on an incline as shown in FIG. 2 for comfort or ease of the passenger 16 in grasping them, but in any event these handles will be in the area of the garment slits 24 so that merely by thrusting his hands in the slits 24, the passenger 16 easily finds the handles 28, gripping them for safety in maintaining his seat on the tandem 14.

Figure 4:
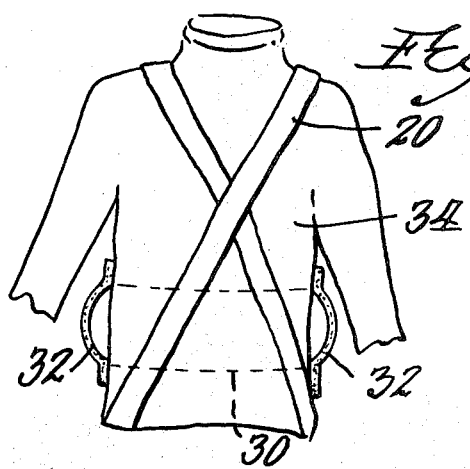
FIG. 4 is a rear view of a garment to which the handles are secured directly and including a highly visible crossed belt.

It will be clear that the belt 22 could be attached to the inside of the garment as is indicated at 30 in FIG. 4, or it may be attached to the top portion of the trousers, or it could be simply passed about the body, but in any event it comprises a garment having handles thereon for the comfort and safety of the passenger.

As shown in FIG. 4, heavy loop-type handles 32, 32 may be attached to the opposite sides of any garment 34, e.g. illustrated as a jacket or shirt of any kind. If the belt 30 is secured to the garment, it may have the handles thereon exactly as in FIG. 2 but extending through slits of the garment, or there may be no slits in the garment, the handles 32 being exterior of the jacket while being attached to the belt 30 through the garment by any desired means. Conversely of course the handles or grips 32 may be secured to the garment without being backed up by the heavy belt, and the function is the same as before.

As a further element of the invention, the handles 28 or 32 are provided either permanently attached to the belt or the garment or they may be connected thereto by well known detachable fasteners as for instance swivel snaps or by any other well known means to provide for removing them in the event that they should not be desired to be left on the garment at all times.

We claim:

1. A safety garment to be worn by the driver of a tandem seat cycle and including a belt adapted to be worn about the waist of the driver, a pair of handles mounted on the belt at the sides thereof, apertures in the garment, the handles being coincident with the apertures and extending therethrough to appear at the sides of the driver of the cycle in position for the passenger on the tandem seat to grasp to aid in maintaining a secure position on the tandem seat.

2. The safety garment of claim 1 wherein the handles are mounted at an inclination which respect to the vertical for easier grasping on the part of the passenger.

References Cited

UNITED STATES PATENTS

| | | | |
|---|---|---|---|
| 1,773,442 | 8/1930 | Speh | 2—94 |
| 2,753,100 | 7/1956 | Montgomery | 182—9 |
| 1,537,230 | 5/1925 | Godbehere | 2—93 X |
| 1,538,632 | 5/1925 | Goldstein | 2—93 X |
| 1,903,081 | 3/1933 | Wotherspoon | 2—338 X |
| 2,130,439 | 9/1938 | Wheeler | 2—93 |
| 3,022,855 | 2/1962 | Lewis | 182—3 |

OTHER REFERENCES

Vogt-Ad. Copy in Group 365 (2–94).

MERVIN STEIN, Primary Examiner

G. V. LARKIN, Assistant Examiner